US012320647B2

(12) United States Patent
Gao et al.

(10) Patent No.: US 12,320,647 B2
(45) Date of Patent: Jun. 3, 2025

(54) INERTIAL MEASUREMENT MODULE AND UNMANNED AERIAL VEHICLE

(71) Applicant: AUTEL ROBOTICS CO., LTD., Guangdong (CN)

(72) Inventors: Han Gao, Guangdong (CN); Tianbao Zhang, Guangdong (CN); Gang Chen, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 257 days.

(21) Appl. No.: 17/936,903

(22) Filed: Sep. 30, 2022

(65) Prior Publication Data

US 2023/0228573 A1 Jul. 20, 2023

Related U.S. Application Data

(63) Continuation of application No. PCT/CN2021/083349, filed on Mar. 26, 2021.

(30) Foreign Application Priority Data

Apr. 8, 2020 (CN) .......................... 202020508374.5

(51) Int. Cl.
*G01C 21/16* (2006.01)
*B64U 20/80* (2023.01)
(Continued)

(52) U.S. Cl.
CPC ........... *G01C 21/166* (2020.08); *B64U 20/80* (2023.01); *B64U 20/83* (2023.01); *B64U 2101/00* (2023.01)

(58) Field of Classification Search
CPC G01C 21/00–166; B64U 20/00; B64U 20/80; B64U 20/83; B64U 2101/00
See application file for complete search history.

(56) References Cited

U.S. PATENT DOCUMENTS

2020/0041623 A1  2/2020  Keyetieu et al.

FOREIGN PATENT DOCUMENTS

| CN | 102980584 A | 3/2013 | |
| CN | 206002115 U | * 3/2017 | ............ G01C 21/16 |

(Continued)

OTHER PUBLICATIONS

Machine Translation of CN-108698703-A (Year: 2022).*

(Continued)

*Primary Examiner* — Nguyen Q. Ha
(74) *Attorney, Agent, or Firm* — Frank Gao, Esq.

(57) ABSTRACT

Embodiments of the present invention is an inertial measurement module, including a mount, a circuit board, a thermally conductive member and a cover plate mounted to the mount. The circuit board is mounted to an end surface of the mount, and is configured to mount an inertial measurement assembly and the thermally conductive member. The inertial measurement assembly includes a thermal resistor and an inertial measurement unit. The thermally conductive member is configured to abut against the thermal resistor and the inertial measurement unit. A surface of the cover plate is provided with a first groove. A receiving space is formed by the first groove and the surface of the mount. The circuit board and the thermally conductive member are both received in the receiving space. The thermally conductive member is arranged at a preset distance from a bottom of the first groove.

16 Claims, 2 Drawing Sheets

(51) Int. Cl.
*B64U 20/83* (2023.01)
*B64U 101/00* (2023.01)

(56) References Cited

FOREIGN PATENT DOCUMENTS

| | | | | |
|---|---|---|---|---|
| CN | 207407893 U | 5/2018 | | |
| CN | 207773419 U | 8/2018 | | |
| CN | 108698703 A | * 10/2018 | ........... | B64C 27/001 |
| CN | 209684001 U | 11/2019 | | |
| CN | 111426317 A | 7/2020 | | |
| CN | 211926880 U | 11/2020 | | |

OTHER PUBLICATIONS

Machine Translation of CN-206002115-U (Year: 2017).*
The International Search Report mailed Jun. 30, 2021; PCT/CN2021/083349.

* cited by examiner

INERTIAL MEASUREMENT MODULE AND UNMANNED AERIAL VEHICLE

CROSS-REFERENCE TO RELATED APPLICATIONS

The present application is a continuation of International Application No. PCT/CN2021/083349, filed on Mar. 26, 2021, which claims priority to Chinese Patent Application No. 2020205083745, filed on Apr. 8, 2020, which is incorporated herein by reference in its entirety.

TECHNICAL FIELD

Embodiments of the disclosure relate to the technical field of unmanned aerial vehicles (UAV), and in particular, to an inertial measurement module and a UAV.

BACKGROUND

An inertial measurement assembly is configured to detect attitude information of a moving object. The inertial measurement assembly generally includes an accelerometer and a gyroscope. The accelerometer is configured to detect an acceleration component of the object, and the gyroscope is configured to detect angle information of the object. By virtue of the function of measuring a three-axis attitude angle (or an angular rate) and an acceleration of an object, an inertial measurement unit is usually used as a core component for navigation and guidance, and is widely used in devices requiring motion control such as vehicles, ships, robots, or aircrafts.

During implementation of the disclosure, the inventor of the disclosure found the following problem: Currently, a thermally conductive material of the inertial measurement assembly of the UAV directly covers surfaces of a thermal resistor and an inertial measurement body, and is held through engagement of an upper shell and a lower shell, so that heat generated by the thermal resistor can be transferred to the inertial measurement body, thereby causing the inertial measurement body to be at a normal operation temperature. However, in the assembled structure, squeeze exists between the thermally conductive material and the inertial measurement body. During flight of the UAV, a stress change of the inertial measurement body caused by a temperature change causes inaccuracy and instability of flight control, resulting in inconvenience during use.

SUMMARY

In order to resolve the above technical problem, embodiments of the disclosure provide an inertial measurement module and an unmanned aerial vehicle (UAV) that can be conveniently used.

The embodiments of the disclosure adopt the following technical solution to resolve the technical problem.

An inertial measurement module is provided, including:
  a mount;
  a circuit board, mounted to a surface of the mount;
  an inertial measurement assembly, including a thermal resistor and an inertial measurement unit, where the thermal resistor and the inertial measurement unit are spaced apart on the circuit board;
  a thermally conductive member, mounted to the circuit board and arranged on a same surface as the inertial measurement assembly, where the thermally conductive member is configured to abut against the thermal resistor and the inertial measurement unit, so that heat generated by the thermal resistor is transferred to the inertial measurement unit; and
  a cover plate, having a surface provided with a first groove, where the cover plate is detachably mounted to the mount, so that a receiving space is formed by the first groove and the surface of the mount, the circuit board and the thermally conductive member are both received in the receiving space, and the thermally conductive member is arranged at a preset distance from a bottom of the first groove.

Optionally, an end surface of the thermally conductive member abuts against the thermal resistor, and a side surface adjacent to the end surface abuts against a side surface of the inertial measurement unit.

Optionally, the mount is provided with a second groove, and the circuit board is detachably mounted in the second groove.

Optionally, the inertial measurement module further includes a bonding layer. Two end surfaces of the bonding layer respectively abut against the mount and an end surface of the circuit board, and the bonding layer is configured to bond the circuit board in the second groove.

Optionally, a side wall of the second groove is provided with an opening. The opening is configured to communicate an inner space of the second groove with the outside. A connection line of the circuit board extends out through the opening.

Optionally, the inertial measurement module further includes a thermally insulative frame. The thermally insulative frame is mounted between the mount and the cover plate, so that the mount and the cover plate are spaced apart.

Optionally, the thermally insulative frame is provided with a positioning hole, and the mount is provided with a positioning protrusion. The positioning hole is disposed around the positioning protrusion, so that the thermally insulative frame is positioned and mounted to the mount.

Optionally, the inertial measurement module further includes a screw, the cover plate is provided with a communication hole, and the positioning protrusion is provided with a threaded hole. A threaded end of the screw extends through the communication hole and is then threadedly connected to the threaded hole, so that the cover plate is detachably mounted to the mount.

Optionally, four positioning holes, four positioning protrusions, four communication holes, and four threaded holes are arranged.

The embodiments of the disclosure further adopt the following technical solution to resolve the technical problem.

A UAV 110 is provided, including the above inertial measurement module 100. See, for example, FIG. 1.

The embodiments of the disclosure have the following beneficial effects: The inertial measurement module of the embodiments of the disclosure includes the mount, the circuit board, the thermally conductive member and the cover plate. The circuit board is mounted to the end surface of the mount, and is configured to mount the inertial measurement assembly. The thermally conductive member is mounted to the circuit board and arranged on the same surface as the inertial measurement assembly. The inertial measurement assembly includes the thermal resistor and the inertial measurement unit. The thermal resistor and the inertial measurement unit are mounted to present mounting positions on the circuit board. The thermally conductive member is configured to abut against the thermal resistor and the inertial measurement unit, so that heat generated by the thermal resistor is transferred to the inertial measurement unit. The surface of the cover plate is provided with the first groove, and the cover plate is detachably mounted to the mount, so that the receiving space is formed by the first groove and the surface of the mount. The circuit board and the thermally conductive member are both received in the receiving space, and the thermally conductive member is arranged at the preset distance from the bottom of the first groove. In this way, the cover plate and the thermally conductive member are prevented from contacting each other, and the thermally conductive member and the inertial measurement unit are prevented from squeezing each other. Therefore, the stress change of the inertial measurement unit caused by the temperature change is reduced or prevented, thereby improving the accuracy and stability of flight control and facilitating usage.

BRIEF DESCRIPTION OF THE DRAWINGS

One or more embodiments are exemplarily described with reference to the corresponding figures in the accompanying drawings, and the descriptions are not to be construed as limiting the embodiments. Components in the accompanying drawings that have same reference numerals are represented as similar components, and unless otherwise particularly stated, the figures in the accompanying drawings are not drawn to scale.

DETAILED DESCRIPTION

For ease of understanding this disclosure, this disclosure is described in further detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by terms such as "up", "down", "inside", "outside", "vertical", and "horizontal" are based on orientation or position relationships shown in the accompanying drawings, and are merely used for ease of description of the disclosure and for brevity of description, rather than indicating or implying that the mentioned apparatus or element needs to have a particular orientation or needs to be constructed and operated in a particular orientation, and therefore should not be understood as a limitation on the disclosure. In addition, terms "first" and "second" are merely used for description and should not be understood as indicating or implying relative importance.

Unless otherwise defined, all technical and scientific terms used herein have the same meaning as commonly understood by one of ordinary skill in the art to which this disclosure belongs. The terms used in the specification of this disclosure are merely used for describing specific embodiments, and are not intended to limit this disclosure. A term "and/or" used in this specification includes any or all combinations of one or more related listed items.

In addition, technical features involved in different embodiments of the disclosure described below may be combined together if there is no conflict.

Figures 1, 2, 3:
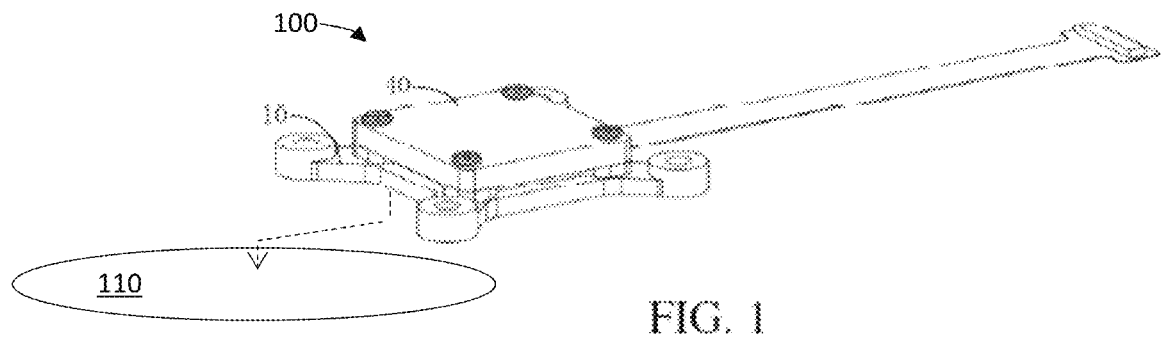
FIG. 1 is a schematic structural diagram of an inertial measurement module according to an embodiment of the disclosure.
FIG. 2 is a structural exploded view of FIG. 1.
FIG. 3 is a schematic structural diagram of a cover plate in FIG. 2.

As shown in FIG. 1 to FIG. 3, an inertial measurement module 100 provided in an embodiment of the disclosure includes a mount 10, a circuit board 20, a thermally conductive member 30 and a cover plate 40. The circuit board is mounted to a surface of the mount 10. The circuit board is configured to mount an inertial measurement assembly 50. The thermally conductive member 30 is mounted to the circuit board 20 and is arranged on the same surface as the inertial measurement assembly 50. The inertial measurement assembly 50 includes a thermal resistor 51 and an inertial measurement unit 52. The thermal resistor 51 and the inertial measurement unit 52 are mounted to the circuit board 20 at preset mounting positions. The thermally conductive member 30 is configured to abut against the thermal resistor 51 and the inertial measurement unit 52, so that heat generated by the thermal resistor 51 is transferred to the inertial measurement unit 52. The cover plate 40 has a surface provided with a first groove 41. The cover plate 40 is detachably mounted to the mount 10, so that a receiving space is formed by the first groove 41 and the surface of the mount 10. The circuit board 20 and the thermally conductive member 30 are both received in the receiving space. The thermally conductive member 30 is arranged at a preset distance from a bottom of the first groove 41. In this way, the cover plate 40 and the thermally conductive member 30 are prevented from contacting each other, and the thermally conductive member 30 and the inertial measurement unit 52 are prevented from squeezing each other. Therefore, the stress change of the inertial measurement unit 52 caused by the temperature change is reduced or prevented, thereby improving the accuracy and stability of flight control and facilitating usage.

The thermally conductive member 30 is made of a material with high thermal conductivity, which may be metal, plastic, or a thermally conductive adhesive. In this embodiment, the thermally conductive member 30 is a thermally conductive adhesive. The thermally conductive member 30 may be arranged on the circuit board 20 in two manners. In a first manner, the thermally conductive member 30 directly covers upper surfaces of the thermal resistor 51 and the inertial measurement unit 52, which are surfaces of the thermal resistor 51 and the inertial measurement unit 52 away from the circuit board 20. In a second manner, an end surface of the thermally conductive member 30 abuts against the thermal resistor 51, and a side surface adjacent to the end surface abuts against a side surface of the inertial measurement unit 52. In this case, the surface of the inertial measurement unit 52 away from the circuit board 20 is not in contact with the thermally conductive member 30. That is to say, the thermally conductive member 30 avoids the mounting position of the inertial measurement unit 52 while realizing heat conduction. In this embodiment, the thermally conductive member 30 is mounted to the circuit board in the second manner.

In some embodiments, the mount 10 is provided with a second groove 11, and the circuit board 20 is detachably mounted in the second groove 11. It is understandable that an outer dimension of the second groove 11 is slightly greater than an outer dimension of the circuit board 20, and a depth of the second groove 11 is greater than a thickness of the circuit board 20, so that the circuit board 20 can be received in the second groove 11.

In some embodiments, the inertial measurement module 100 further includes a bonding layer (not shown). Two end surfaces of the bonding layer respectively abut against the mount 10 and an end surface of the circuit board 20, and the bonding layer is configured to bond the circuit board 20 in the second groove 11. Certainly, the circuit board 20 may be fixedly mounted in the second groove 11 in other manners, for example, through screw connection or snap connection.

In some embodiments, a side wall of the second groove 11 is provided with an opening 111. The opening 111 is configured to communicate an inner space of the second groove 11 with the outside, so that a connection line of the circuit board 20 extends out through the opening 111.

Figure 4:
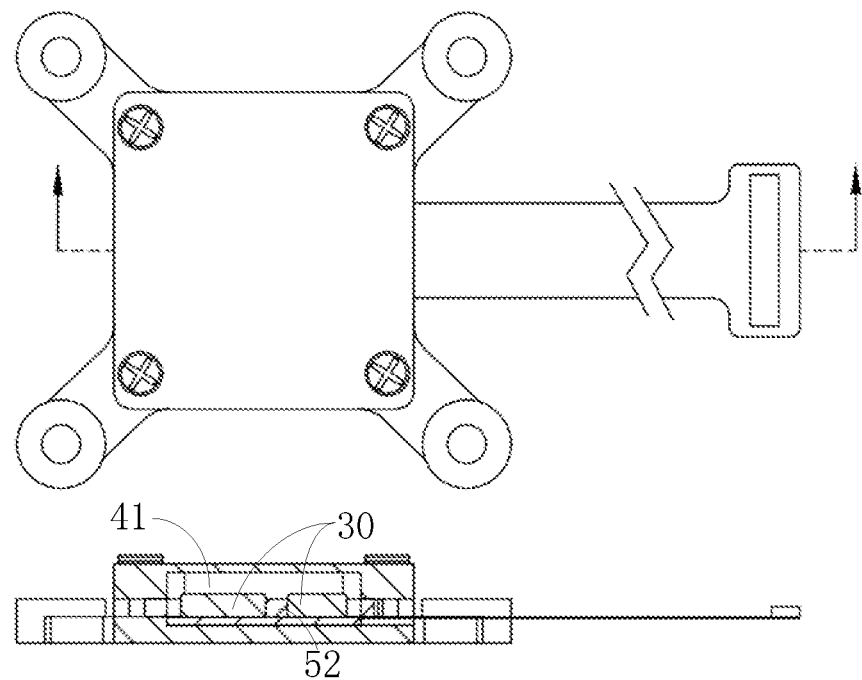
FIG. 4 is a cross-sectional view of FIG. 1 from another perspective.
Figure 5:
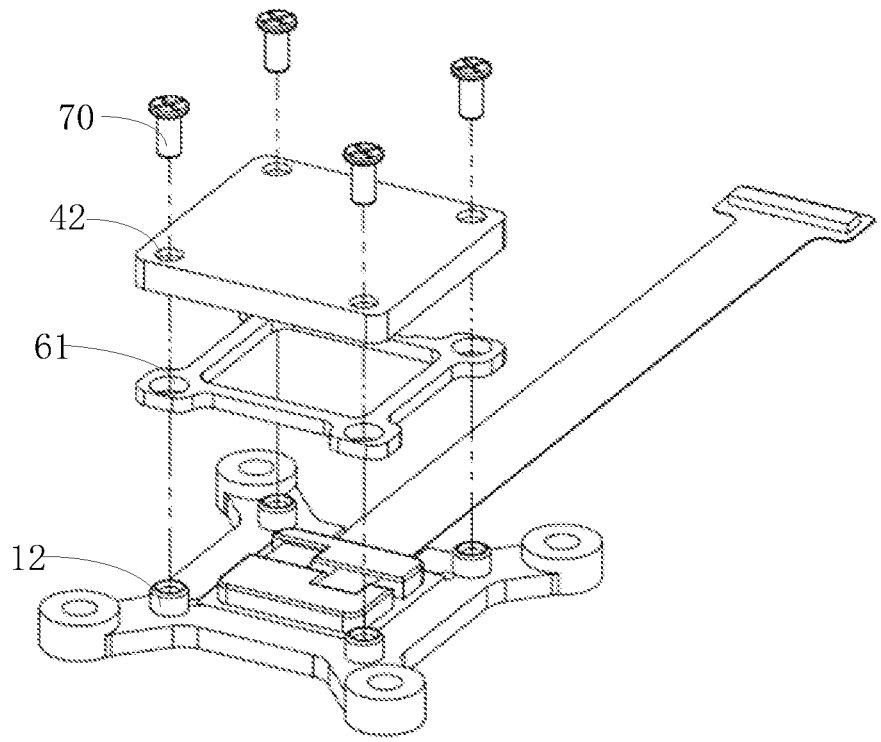
FIG. 5 is another schematic structural diagram of FIG. 1.

Referring to FIG. 4 and FIG. 5, in some embodiments, the inertial measurement module 100 further includes a thermally insulative frame 60. The thermally insulative frame 60 is mounted between the mount 10 and the cover plate 40, so that the mount 10 and the cover plate 40 are spaced apart. Specifically, during use, the thermally insulative frame 60 surrounds the circuit board 20, and the thermally insulative frame 60 avoids direct contact between the mount 10 and the cover plate 40, which increases the difficulty in transferring heat to the outside by the inertial measurement assembly 50, thereby reducing or blocking the heat dissipation of the inertial measurement assembly 50 on the circuit board 20 to the outside. In this way, the warmup time of the inertial measurement assembly 50 before take-off of the UAV 110 is greatly reduced.

In some embodiments, the thermally insulative frame 60 is provided with a positioning hole 61, and the mount 10 is provided with a positioning protrusion 12. The positioning hole 61 is disposed around the positioning protrusion 12, so that the thermally insulative frame 60 is positioned and mounted to the mount 10. In this embodiment, four positioning holes 61 and four positioning protrusions 12 are arranged. It is understandable that fitting between the positioning holes 61 and the positioning protrusions 12 can improve the mounting efficiency of the thermally insulative frame 60 and the mount 10.

In some embodiments, the inertial measurement module 100 further includes a screw 70. The cover plate 40 is provided with a communication hole 42, and the positioning protrusion 12 is provided with a threaded hole (not shown). A threaded end of the screw 70 extends through the communication hole 42 and is then threadedly connected to the threaded hole, so that the cover plate 40 is detachably mounted to the mount 10, and the thermally insulative frame 60 abuts against the cover plate 40. In this embodiment, four communication holes 42 and four threaded holes are arranged.

The inertial measurement module 100 of the embodiments of the disclosure includes the mount 10, the circuit board 20, the thermally conductive member 30 and the cover plate 40. The circuit board 20 is mounted to the end surface of the mount 10, and is configured to mount the inertial measurement assembly 50. The thermally conductive member 51 is mounted to the circuit board 20 and arranged on the same surface as the inertial measurement assembly 50. The inertial measurement assembly 50 includes the thermal resistor 51 and the inertial measurement unit 52. The thermal resistor 51 and the inertial measurement unit 52 are mounted to present mounting positions on the circuit board 20. The thermally conductive member 30 is configured to abut against the thermal resistor 51 and the inertial measurement unit 52, so that heat generated by the thermal resistor 51 is transferred to the inertial measurement unit 52. The surface of the cover plate 40 is provided with the first groove 41, and the cover plate 40 is detachably mounted to the mount 10, so that the receiving space is formed by the first groove 41 and the surface of the mount 10. The circuit board 20 and the thermally conductive member 30 are both received in the receiving space, and the thermally conductive member 30 is arranged at the preset distance from the bottom of the first groove 41. In this way, the cover plate 40 and the thermally conductive member 30 are prevented from contacting each other, and the thermally conductive member 30 and the inertial measurement unit 52 are prevented from squeezing each other. Therefore, the stress change of the inertial measurement unit 52 caused by the temperature change is reduced or prevented, thereby improving the accuracy and stability of flight control and facilitating usage.

Another embodiment of the disclosure provides a UAV 110, including the inertial measurement module 100 in the above embodiment. See, for example, FIG. 1.

The above descriptions are merely the implementations of the disclosure, and are not intended to limit the scope of the disclosure. Any equivalent structure or equivalent process transformation made by using the contents of the description and the drawings of the disclosure or direct or indirect application to other related technical fields are encompassed in the protection scope of the disclosure.

What is claimed is:

1. An inertial measurement module, comprising:
a mount;
a circuit board, mounted to a surface of the mount;
an inertial measurement assembly, comprising a thermal resistor and an inertial measurement unit, wherein the thermal resistor and the inertial measurement unit are spaced apart on the circuit board;
a thermally conductive member, mounted to the circuit board and arranged on a same surface as the inertial measurement assembly, wherein the thermally conductive member is configured to abut against the thermal resistor and the inertial measurement unit, so that heat generated by the thermal resistor is transferred to the inertial measurement unit; and
a cover plate, having a surface provided with a first groove, wherein the cover plate is detachably mounted to the mount, so that a receiving space is formed by the first groove and the surface of the mount, the circuit board and the thermally conductive member are both received in the receiving space, and the thermally conductive member is arranged at a preset distance from a bottom of the first groove;
wherein an end surface of the thermally conductive member abuts against the thermal resistor, and a side surface adjacent to the end surface abuts against a side surface of the inertial measurement unit.

2. The inertial measurement module according to claim 1, wherein the mount is provided with a second groove, and the circuit board is detachably mounted in the second groove.

3. The inertial measurement module according to claim 2, further comprising a bonding layer, wherein two end surfaces of the bonding layer respectively abut against the mount and an end surface of the circuit board, and the bonding layer is configured to bond the circuit board in the second groove.

4. The inertial measurement module according to claim 3, wherein a side wall of the second groove is provided with an opening, the opening is configured to communicate an inner space of the second groove with the outside, and a connection line of the circuit board extends out through the opening.

5. The inertial measurement module according to claim 1, further comprising a thermally insulative frame, wherein the thermally insulative frame is mounted between the mount and the cover plate, so that the mount and the cover plate are spaced apart.

6. The inertial measurement module according to claim 5, wherein the thermally insulative frame is provided with a positioning hole, the mount is provided with a positioning protrusion, and the positioning hole is disposed around the positioning protrusion, so that the thermally insulative frame is positioned and mounted to the mount.

7. The inertial measurement module according to claim 6, further comprising a screw, the cover plate is provided with a communication hole, the positioning protrusion is provided with a threaded hole, and a threaded end of the screw extends through the communication hole and is then threadedly connected to the threaded hole, so that the cover plate is detachably mounted to the mount.

8. The inertial measurement module according to claim 7, wherein
the thermally insulative frame is provided with a second positioning hole, the mount is provided with a second positioning protrusion, and the second positioning hole is disposed around the second positioning protrusion, so that the thermally insulative frame is positioned and mounted to the mount,
the thermally insulative frame is provided with a third positioning hole, the mount is provided with a third positioning protrusion, and the third positioning hole is disposed around the third positioning protrusion, so that the thermally insulative frame is positioned and mounted to the mount,
the thermally insulative frame is provided with a fourth positioning hole, the mount is provided with a fourth positioning protrusion, and the fourth positioning hole is disposed around the fourth positioning protrusion, so that the thermally insulative frame is positioned and mounted to the mount,
the inertial measurement module further comprising:
a second screw, the cover plate is provided with a second communication hole, the second positioning protrusion is provided with a second threaded hole, and a threaded end of the second screw extends through the second communication hole and is then threadedly connected to the second threaded hole, so that the cover plate is detachably mounted to the mount;
a third screw, the cover plate is provided with a third communication hole, the third positioning protrusion is provided with a third threaded hole, and a threaded end of the third screw extends through the third communication hole and is then threadedly connected to the third threaded hole, so that the cover plate is detachably mounted to the mount; and
a fourth screw, the cover plate is provided with a fourth communication hole, the fourth positioning protrusion is provided with a fourth threaded hole, and a threaded end of the fourth screw extends through the fourth communication hole and is then threadedly connected to the fourth threaded hole, so that the cover plate is detachably mounted to the mount.

9. An unmanned aerial vehicle (UAV), comprising an inertial measurement module, wherein the inertial measurement module comprises:
a mount;
a circuit board, mounted to a surface of the mount;
an inertial measurement assembly, comprising a thermal resistor and an inertial measurement unit, wherein the thermal resistor and the inertial measurement unit are spaced apart on the circuit board;
a thermally conductive member, mounted to the circuit board and arranged on a same surface as the inertial measurement assembly, wherein the thermally conductive member is configured to abut against the thermal resistor and the inertial measurement unit, so that heat generated by the thermal resistor is transferred to the inertial measurement unit;
a cover plate, having a surface provided with a first groove, wherein the cover plate is detachably mounted to the mount, so that a receiving space is formed by the first groove and the surface of the mount, the circuit board and the thermally conductive member are both received in the receiving space, and the thermally conductive member is arranged at a preset distance from a bottom of the first groove; and
a thermally insulative frame, wherein the thermally insulative frame is mounted between the mount and the cover plate, so that the mount and the cover plate are spaced apart.

10. The UAV according to claim 9, wherein an end surface of the thermally conductive member abuts against the thermal resistor, and a side surface adjacent to the end surface abuts against a side surface of the inertial measurement unit.

11. The UAV according to claim 9, wherein the mount is provided with a second groove, and the circuit board is detachably mounted in the second groove.

12. The UAV according to claim 11, further comprising a bonding layer, wherein two end surfaces of the bonding layer respectively abut against the mount and an end surface of the circuit board, and the bonding layer is configured to bond the circuit board in the second groove.

13. The UAV according to claim 12, wherein a side wall of the second groove is provided with an opening, the opening is configured to communicate an inner space of the second groove with the outside, and a connection line of the circuit board extends out through the opening.

14. The UAV according to claim 9, wherein the thermally insulative frame is provided with a positioning hole, the mount is provided with a positioning protrusion, and the positioning hole is disposed around the positioning protrusion, so that the thermally insulative frame is positioned and mounted to the mount.

15. The UAV according to claim 14, further comprising a screw, the cover plate is provided with a communication hole, the positioning protrusion is provided with a threaded hole, and a threaded end of the screw extends through the communication hole and is then threadedly connected to the threaded hole, so that the cover plate is detachably mounted to the mount.

16. The UAV according to claim 15, wherein
the thermally insulative frame is provided with a second positioning hole, the mount is provided with a second positioning protrusion, and the second positioning hole is disposed around the second positioning protrusion, so that the thermally insulative frame is positioned and mounted to the mount,
the thermally insulative frame is provided with a third positioning hole, the mount is provided with a third positioning protrusion, and the third positioning hole is disposed around the third positioning protrusion, so that the thermally insulative frame is positioned and mounted to the mount, the thermally insulative frame is provided with a fourth positioning hole, the mount is provided with a fourth positioning protrusion, and the fourth positioning hole is disposed around the fourth positioning protrusion, so that the thermally insulative frame is positioned and mounted to the mount, the inertial measurement module further comprising:

a second screw, the cover plate is provided with a second communication hole, the second positioning protrusion is provided with a second threaded hole, and a threaded end of the second screw extends through the second communication hole and is then threadedly connected to the second threaded hole, so that the cover plate is detachably mounted to the mount;

a third screw, the cover plate is provided with a third communication hole, the third positioning protrusion is provided with a third threaded hole, and a threaded end of the third screw extends through the third communication hole and is then threadedly connected to the third threaded hole, so that the cover plate is detachably mounted to the mount; and a fourth screw, the cover plate is provided with a fourth communication hole, the fourth positioning protrusion is provided with a fourth threaded hole, and a threaded end of the fourth screw extends through the fourth communication hole and is then threadedly connected to the fourth threaded hole, so that the cover plate is detachably mounted to the mount.

* * * * *